US006216623B1

(12) United States Patent
Wilkins

(10) Patent No.: US 6,216,623 B1
(45) Date of Patent: Apr. 17, 2001

(54) TANKER VOID SPACE LEAKAGE DETECTOR SYSTEM

(75) Inventor: Larry C. Wilkins, New Albany, IN (US)

(73) Assignee: Electromechanical Research Laboratories, Inc., New Albany, IN (US)

( * ) Notice: Subject to any disclaimer, the term of this patent is extended or adjusted under 35 U.S.C. 154(b) by 0 days.

(21) Appl. No.: 08/942,060

(22) Filed: Oct. 1, 1997

(51) Int. Cl.$^7$ .................................................. B63B 25/08
(52) U.S. Cl. ......................................... 114/74 A; 114/74 R
(58) Field of Search .................................. 114/72, 74 A, 114/74 R

(56) References Cited

U.S. PATENT DOCUMENTS

| | | | |
|---|---|---|---|
| 4,063,457 | 12/1977 | Zewkulin et al. | 73/290 |
| 4,815,323 | 3/1989 | Ellinger et al. | 73/290 |
| 4,984,449 | 1/1991 | Caldwell et al. | 73/492 |
| 5,054,319 | 10/1991 | Fling | 73/319 |
| 5,076,101 | 12/1991 | Lazure | 73/290 |
| 5,095,748 | 3/1992 | Gregory et al. | 73/290 |
| 5,127,266 | 7/1992 | Maresca et al. | 73/290 |
| 5,131,271 | 7/1992 | Haynes et al. | 73/290 |
| 5,271,350 | * 12/1993 | Newburger | 114/74 A |
| 5,319,973 | 6/1994 | Crayton et al. | 73/290 |

FOREIGN PATENT DOCUMENTS

1749717 A1    7/1992 (SU).

* cited by examiner

*Primary Examiner*—Stephen Avila
(74) *Attorney, Agent, or Firm*—Woodard, Emhardt, Naughton, Moriarty & McNett

(57) ABSTRACT

Each barge in a group of river-going tanker barges, has a double-hull construction to protect the inner hull and avoid collision-induced cargo spills. The space between hulls is partitioned to individual empty, dry compartments with a vertical, open bottomed, measuring tube fixed in each. A closed-bottom master tube is fixed in one compartment. All tubes have a quick-connect, above-deck, flange to receive an ultrasonic transducer thereon. A hand-held measuring instrument containing a computer and controls and information display contains a transducer which is selectively pulsed to periodically send ultrasonic signals down the tube, and receive echo signals, with elapsed time representing the depth of a signal reflector surface which is the master tube bottom or, for the measuring tubes, the bottom of a dry compartment or the surface of liquid in a leaking compartment. A unique bar code with each tube, distinguishes it and the barge from all others. The measuring instrument includes a code reader. In one embodiment, an individual transducer is on each tube, and connectable by an electrical cable to the measuring instrument. The apparatus is also used in cargo compartment tanks for cargo surface level measurement.

30 Claims, 10 Drawing Sheets

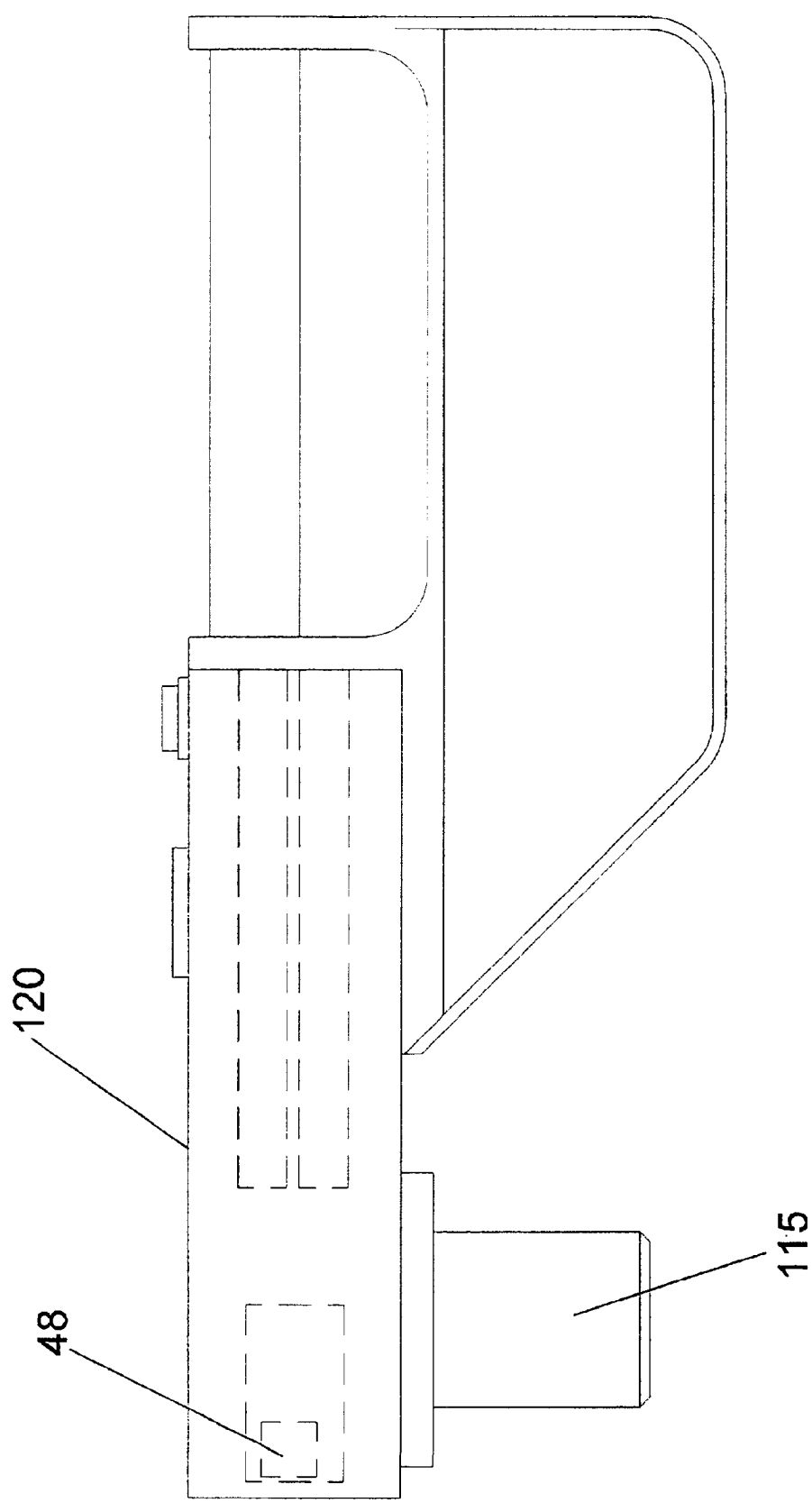

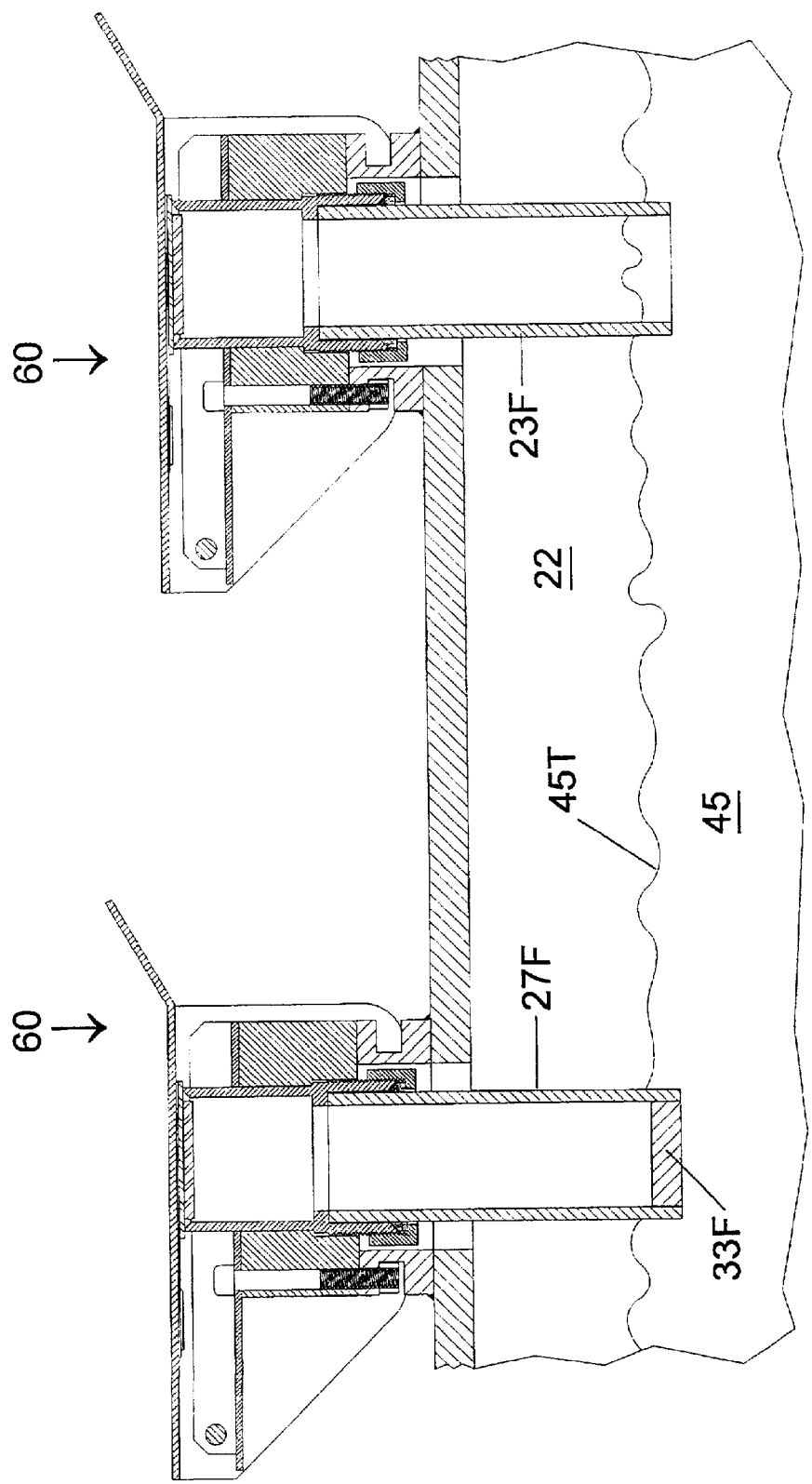

TANKER VOID SPACE LEAKAGE DETECTOR SYSTEM

BACKGROUND OF THE INVENTION

1. Field of the Invention

This invention relates generally to containers for liquids, and more particularly to methods and apparatus for detection of liquid levels of liquids that have either leaked into space between the outer hull and inner hull of a double-hulled ship or barge or the like or are purposefully pumped into a tank.

2. Description of the Prior Art

Modern tanker ships and barges are being designed and built with space between the outer hull and an inner hull in an effort to avoid puncture of cargo tanks, and thereby avoid leakage of liquid contents from cargo tanks into a waterway as a result of collision damage. Instead of there being a single void space around the entire inner hull, there are partitions so as to divide the space into a plurality of compartments so that, in the event of a puncture of the outer hull, only a compartment space can be flooded while the remaining compartments remain dry. Also, in the event of a leak developing at some point in the wall of the inner hull, such leakage will only enter the compartment between hulls and not leak out into the waterway if the outer hull is not damaged at the site of that compartment.

In order to be sure that there is no leakage into a compartment from either the waterway or a cargo tank inside the vessel, it is desirable to be able to detect the presence of liquid in a compartment. Heretofore, that has not been easy. First of all, the compartments are usually sealed so as to avoid entry of water or other liquid from the top, as from a deck, for example. Therefore, if presence of liquid in such compartment is to be detected, it has been necessary to provide a hole in the deck and insert a pole through the hole to the bottom of the compartment, and then raise the pole to see if there is any liquid on the lower end of the pole. Considering the fact that such compartments may be as deep as twelve feet on a river barge, and much deeper on an ocean tanker, the handling of such a measuring pole is not easy. Also, it is time consuming.

It is an object of the present invention to facilitate determination of the presence and depth of liquid in a normally void space in a shipping vessel.

Furthermore, when filling tanks with expensive or dangerous compounds it is desirable to prevent overflow of the liquid.

Thus it is a further object of the present invention to protect against overfills in tanks by determining when a liquid has reached a predetermined critical level.

SUMMARY OF THE INVENTION

Described briefly, according to a typical embodiment of the present invention as implemented in a double-hulled, river-going barge, each of the void space compartments is provided with a permanently installed tube extending from the deck down to a point near the bottom of the compartment. The tube is adapted at its top for normally receiving a quick-connect sealing closure. The tube has an opening at or near the bottom end of it. Therefore, any liquid collecting in the compartment can rise inside the tube, particularly if a vent opening in the tube wall near the top of the compartment permits any air in the tube to escape as liquid rises in it.

A measuring instrument is provided with a quick-connect coupling readily receivable and mating with the coupling at the top of each tube after the tube closure has been removed. The measuring instrument includes a transceiver including a transducer selectively operable to transmit ultrasonic energy pulses down the tube, and receive reflected ultrasonic energy pulses. The elapsed time is measured and compared to a master, to calculate the depth of liquid, if any, in the compartment. The calculated depth is displayed on an indicator and, if more than a predetermined acceptable limit, will also illuminate a light or energize a sounder to indicate an alarm condition. The master time/depth information is obtained from a tube which is like those in the compartments except that it has a closed bottom end at a known distance from the transducer when mounted to it, to establish a reference dimension.

Each tube has a bar code identification including two components, one of them being a barge identification and the other being the compartment identification on the barge. The measuring instrument has a bar code reader on it to identify the particular barge and compartment along with the depth indication reading. Information regarding the readings at the various compartments on a barge can be stored in the measuring instrument and subsequently downloaded to a separate computer.

According to one method of use of the apparatus, an individual can walk the barge from end-to-end up one side and down the other. In a preferred mode, the operator will stop at the master tube first and obtain information relating to the master tube length to automatically establish a time factor for the passage of sound in atmosphere at the typical temperature of the compartments in the barge and thereby obtain a reference time useful in subsequent locations on the barge to directly compute and indicate the depth of liquid, if any, in a compartment. In this context, the term "sound" is used, but should not be construed to be limited to an energy wave frequency range that can be heard by humans.

Following calibration of the instrument at the master tube, the operator then moves from that tube to the first compartment measurement tube, connects the instrument, activates the instrument and notes the result. This is done in sequence from one compartment to the next. If, at any compartment, the instrument detects a liquid depth greater than a predetermined acceptable maximum, the alarm condition will be announced not only through the display, but also with some other annunciator such as light, bell, buzzer, or combination thereof. Then the operator knows that a pump is needed to pump that compartment. Once that has been done, check of the other remaining compartments can be performed.

As an alternative approach, the operator can move from compartment-to-compartment on one barge and then on another barge in a string of barges and, either simultaneously through a radio link, or subsequently through a direct wire download, can transmit that information including bar code identification and the depth measurement for each compartment to a computer which then applies the correct sound-velocity-in-air correction factor (UE) to the signals received for each compartment and computes the depth of liquid, if any, in each compartment and, on a printout, flags each compartment for which there is an alarm condition present, the proper UE factor for each barge being predetermined by the master tube measurement for that barge, wherever it occurs in the sequence of tubes checked. There is also provision for ascertaining or assuring that all measurements are made within a reasonable time from the time of measurement of the master tube so that all measurements are representative of essentially the same compartment temperature conditions for a given barge.

In a related application, the invention can be used to provide overfill protection for cargo holds in tankers, or other fluid containers such as railroad tank cars, for example. In such an application, the relative location of the critical fluid level of interest would presumably be nearer the top of the container, but the measuring device could be very similar to the one for the void space leakage detection application. After detecting that the fluid level had exceeded a predetermined level, the pump can be stopped, thereby preventing overfilling of the tank.

BRIEF DESCRIPTION OF THE DRAWINGS

FIG. 9 is a view of the measuring instrument of FIG. 8.

FIG. 10 is a schematic vertical sectional view through a cargo tank in a barge and showing a master tube and a measuring tube applied in an overfill protection mode.

DESCRIPTION OF THE PREFERRED EMBODIMENT

Figure 1:
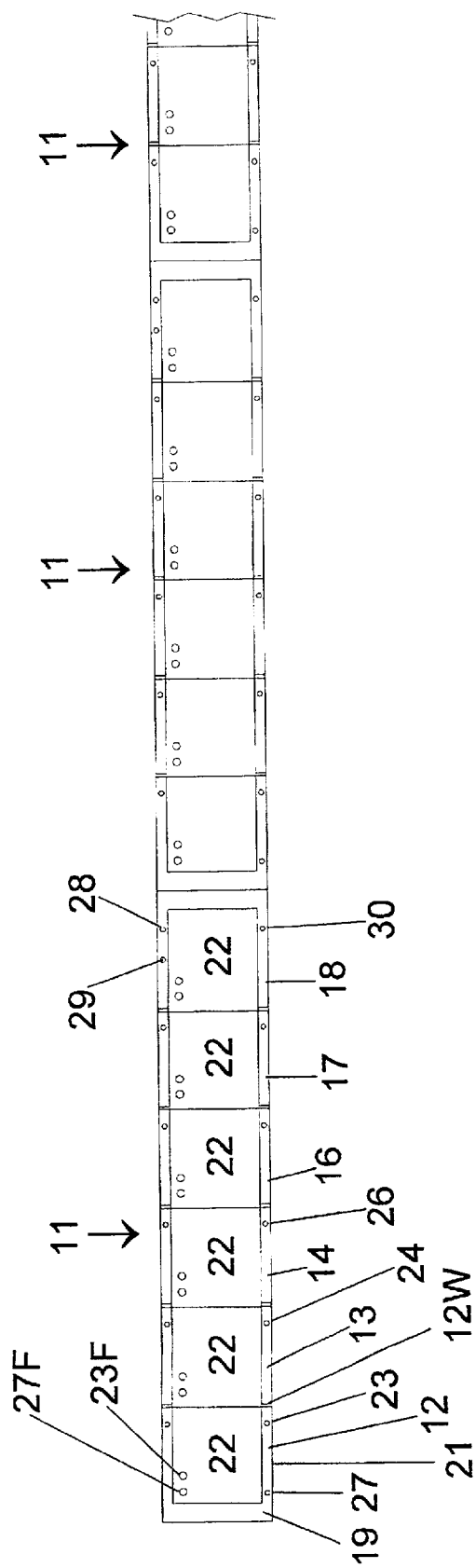
FIG. 1 is a schematic top plan view of a string of barges having an apparatus therein according to the present invention.
Figure 2:
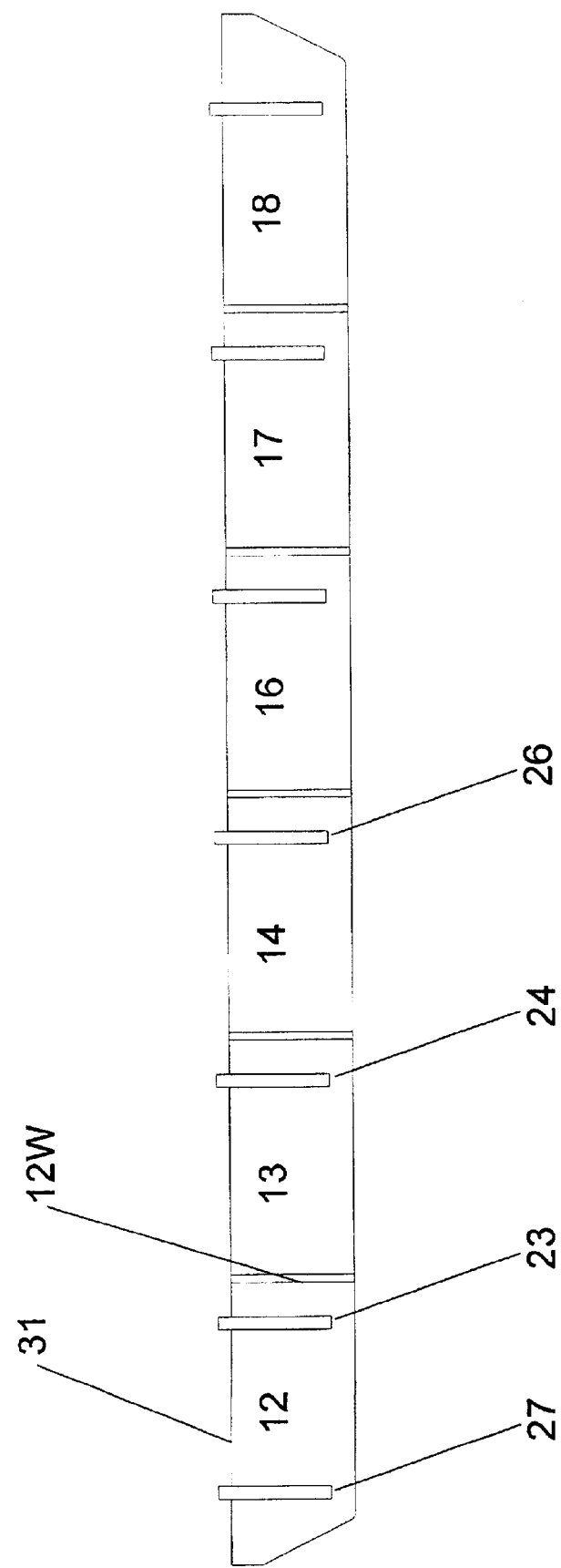
FIG. 2 is a schematic side elevational view of a barge thereof.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated instrument, and such further applications of the principles of the invention as illustrated therein being contemplated as would normally occur to one skilled in the art to which the invention relates.

Referring now to the drawings in detail, FIG. 1 is a schematic top plan view of a string of river barges 11 connected together as in a tow. Each of these has a double-walled hull with six void space compartments such as 12, 13, 14, 16, 17 and 18 on each side of the hull between the outer hull 19 and inner hull 21. The inner hull has a plurality of cargo carrying tanks such as 22 therein. Each of the six compartments at each side of the hull has a measuring tube according to a typical embodiment of the present invention. Several of such tubes are designated by the reference numerals 23, 24 and 26, for example. Also, at each end of the barge there is a master tube such as 27 at one end of the first barge in the string and 28 at the opposite end on the other side of the same barge. Each of the compartments is separated from the next adjacent compartment by a wall such as 12W between compartments 12 and 13. Compartment 12 has the master tube 27 therein and the measuring tube 23. Compartment 18 has master tube 28 therein like master tube 27, and measuring tubes 29 and 30 like measuring tubes 23, 24 and 26 and the others in the other void space compartments in this barge. Where the compartments are approximately twelve feet deep in a barge, the measuring tube and master tube will be approximately twelve feet long to the top of the deck 31.

Figure 3:
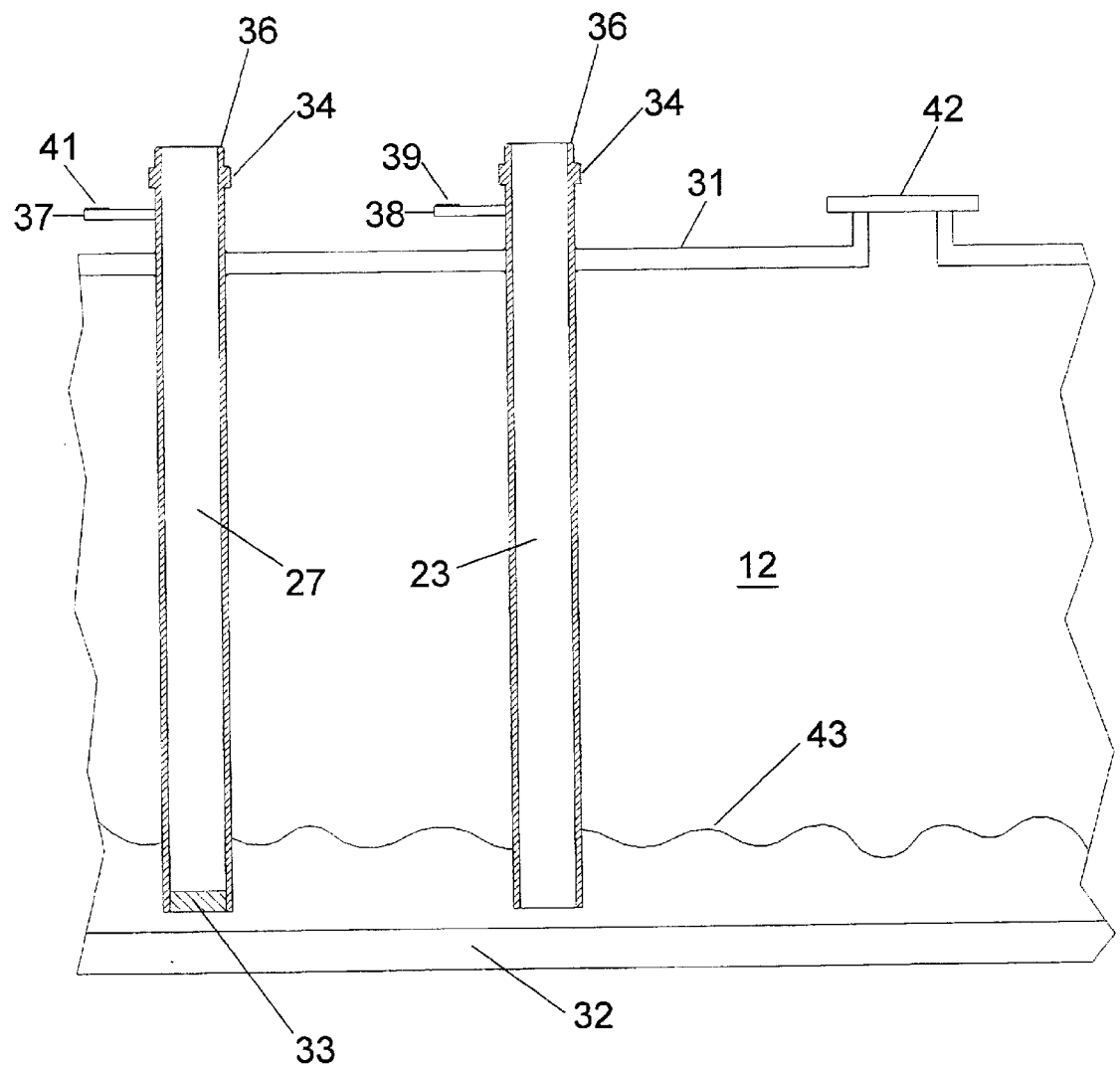
FIG. 3 is a schematic vertical section through a void space compartment showing a master tube, a measuring tube, and an access port and some unwanted liquid in the compartment.

Referring now to FIG. 3, the bottom of the hull is shown at 32 and the master tube and measuring tubes 27 and 23, respectively, are shown installed in compartment 12. These tubes are welded to the deck 31 and are identical except that tube 27 has a plug 33 in the bottom of it, to keep liquid in the tank compartment 12 from entering it. Each of these tubes has a quick-connect mounting flange such as 34 above the deck and near the top 36 of the tube. There is also a bar-code display plate 37 welded to the tube immediately below the flange 34. Although the mounting flange 34 and top and other features of the tubes are identical, the bar code plate 38 on tube 23 is different only in the respect that the bar code 39 on it is different from the bar code 41 on plate 37. The reason for this is the fact that the bar codes must identify not only the barge on which the tubes are mounted, but also the particular compartment on which each measuring tube such as 23 is mounted. The code must also distinguish the master tube from the measuring tubes. The bar code can be embossed, molded, or engraved on the plate itself. Or it can be on stickers, decals or some other medium permanently mounted to the plate with protective coating or covering for endurance. An access hatch 42 is provided on deck 31 for access to compartment 12. Liquid is shown in the compartment as indicated by the liquid surface indicator line 43. Of course, it is desirable that there be no liquid in these compartments, from either the waterway in which the vessel is floating, or from any of the cargo tanks inside the vessel.

Figure 4:
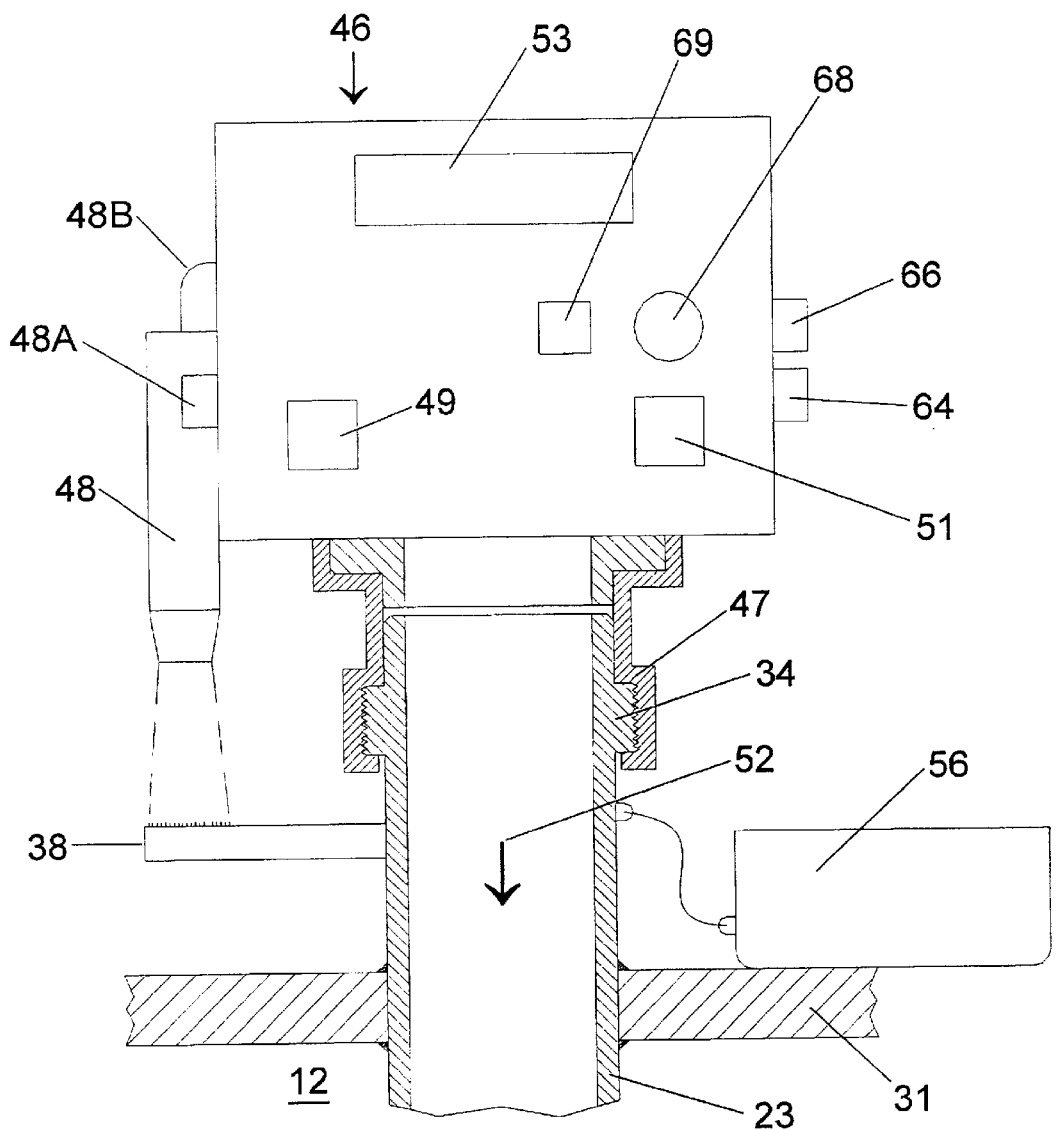
FIG. 4 is an enlarged fragmentary vertical section through a measurement assembly including the measuring instrument with built-in transducer and a side-mounted bar code reader, all together, mounted on the top of one of the measuring tubes.

Referring now to FIG. 4, the measuring instrument 46 is shown mounted to the flange 34 of a measuring tube 23. This is accomplished by a coupling 47 which, in this instance, is affixed to the bottom of the electronic box of the measuring instrument and is mounted in a quick-connect fashion on the quick-connect flange 34. It is important that this mounting be such that, when the instrument is mounted on the tube, it be oriented correctly so that the bar code reader 48 be correctly oriented with respect to the bar code mount plate 38 to illuminate and read the code thereon. A half-turn from mounting to lock of the instrument on flange 34, is an example. The instrument 46 has a transducer therein which, when activated by pushing one of the buttons, such as 49 for a master tube reading, or 51 for a measuring tube reading, will transmit pulses of ultrasonic frequency at an established pulse rate down the tube 23 in the direction of arrow 52 for reflection back to the transducer from either the bottom 32 of the compartment or from the surface of liquid in the tube or, in the case of the master, from the plug 33 at the bottom of the master tube. The transducer will respond to reflected energy, and appropriate calculations are made.

In the case of the master tube, for which button 49 is pushed, the distance from the transducer in the instrument 46 to the top of the plug 33 when the instrument is secured to flange 34, is already known, 132 inches, for example.

Therefore, the computer in the instrument 46 can respond to the elapsed time from the transmission of a pulse-by the transducer to the reception of the echo by the transducer, to compute the UE factor corresponding to the temperature of the air in the master tube in compartment 12. This factor will be used for the depth calculations for the measurements on the measuring tube 23 in this compartment and for the measuring tubes in the rest of the compartments of this barge. This can be done because, for purposes of this invention, in a given barge, all compartments can be assumed to be at about the same temperature, and the depth of all compartments is essentially the same, and all tubes are the same. Therefore, once the master tube information is known, and the UE factor is calculated and stored in the computer, it will be applied uniformly to all of the information obtained from all of the measuring tubes for that barge. With the transducer to echo reflector distance calculated from the temperature-adjusted elapsed time information, and with the barge identification information stored in the computer, the computer can calculate the depth from the vessel bottom to the surface from which the echo is reflected. The computer can be pre-programmed for each barge, with an acceptable depth limit for the particular barge stored in the measuring instrument computer along with the bar code identification for that barge. The person who specifies an acceptable depth, considers the fact that there may always be a certain amount of water in the void space compartments due to condensation, for example. During check of a compartment, the computer announces the measured depth by a digital display in the window 53. It is further programmed to announce an alarm condition by lamp 68 and buzzer 69 if the measured depth exceeds the acceptable limit stored in the computer. It will be evident from the foregoing and following description of the invention, that the measuring instrument is intended to be hand-held, and include a variety of electronics including, but not limited to, a computer, a controller including control components and circuitry, data storage, a display and, possibly, depending on space and weight considerations, a printer. The computer to accomplish the functions, need not be a general purpose computer. It can be a special purpose computer of a rudimentary nature, considering today'state of the art, and can be readily housed in the hand-held instrument 46. Similarly, the power supplies, transducer, above-mentioned and other components in the instrument, can be conventional and are well within the skill of the art and need not be described in any detail herein.

Following the measurement at either the master tube or any of the measuring tubes, the instrument is removed by, for example, a half turn on the mounting flange 34, and the protective cover and seal cap 56 is replaced on the flange 34.

Figure 5:
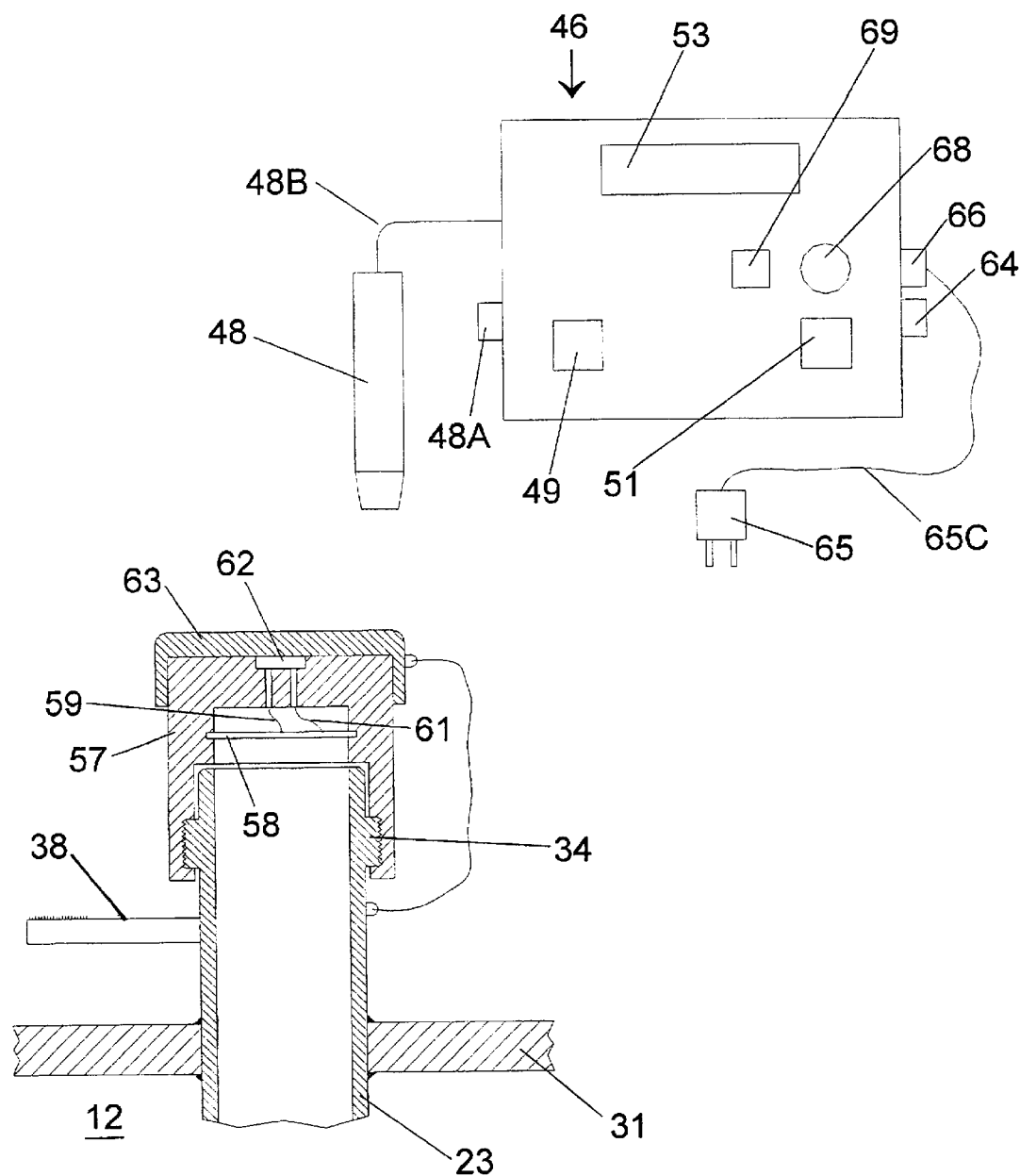
FIG. 5 is an enlarged section similar to FIG. 4 but wherein a transducer is permanently mounted to the top of the measurement tube and has a lid on it for protection of the transducer, but the lid is readily removable for electrically coupling the measuring instrument to the transducer.
Figure 6:
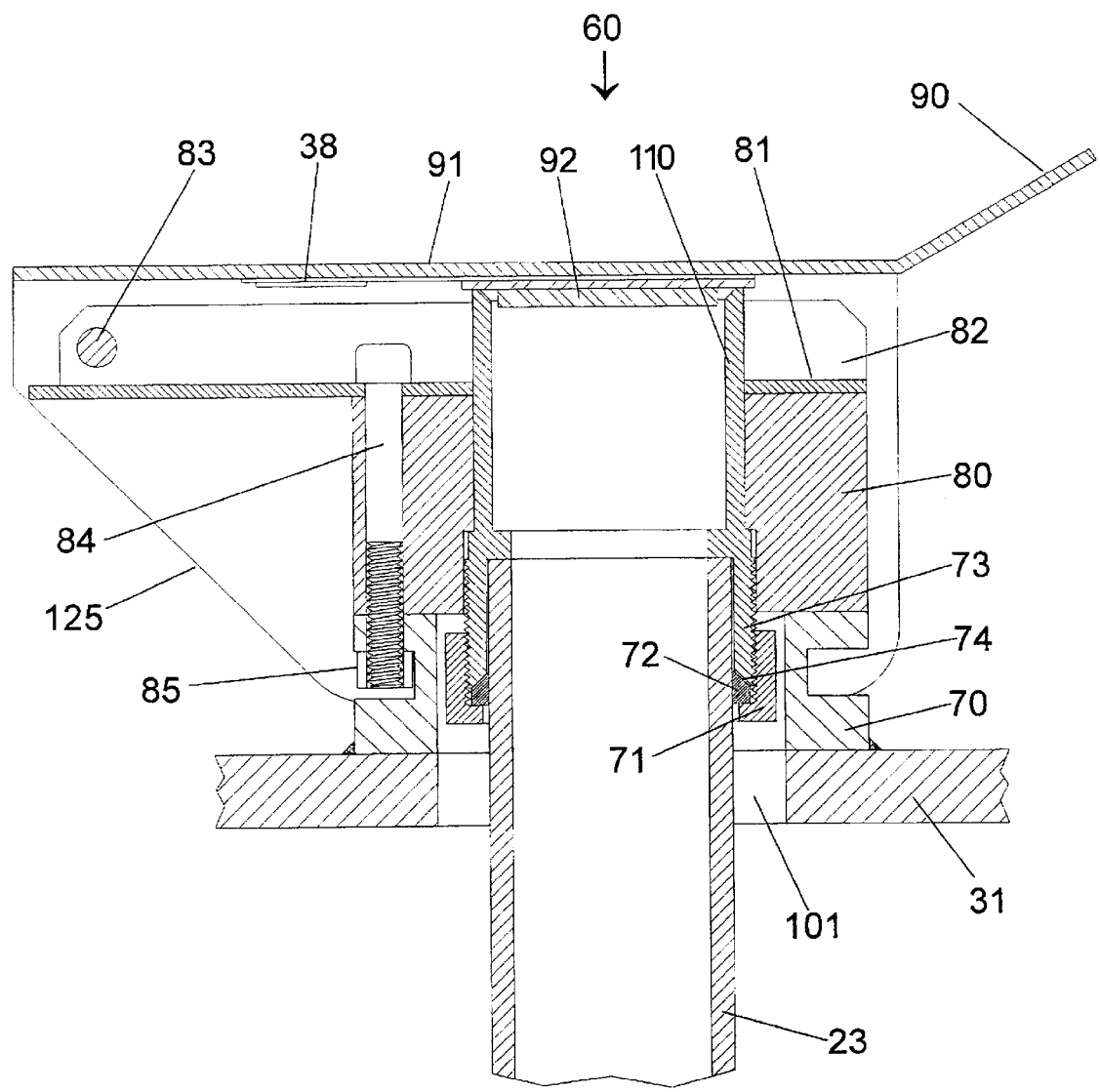
FIG. 6 is an enlarged fragmentary vertical section similar to FIG. 4 but of an alternative embodiment showing measuring tube, lid, and mounting assembly.

In the FIG. 5 embodiment, the arrangement is slightly different in that, although the instrument 46 still has its own transducer, a transducer assembly 57 is permanently mounting on the quick-connect flange 34 of each tube on a barge. It can be removed, if desired. It includes the diaphragm 58 and associated energizing wires 59 and 61 with associated pin sockets in recess 62 covered by the seal cap 63. In this embodiment, when a measurement is to be made, the measuring instrument need not be mounted to the transducer. Instead, the cap 63 may be snapped off the top of the transducer, and a plug 65 connected by a cable 65C to the measuring instrument 46, is installed in socket 62 to activate the transducer diaphragm 58 when button 51 is pushed. After a predetermined time delay, the transducer responds to the echo intercepted by the transducer diaphragm. In this case, the cable can be one connected permanently to the instrument 46 to provide this option, when desired, or it can have a plug at the end opposite plug 65 and which is removably connected to the socket 66 on the instrument, as shown, so the cable can be stored elsewhere when not needed. In the use of the system of FIG. 5, it is still necessary that the code reader function be performed, so the instrument must be held where the code can be read or, the code reader 48 can be unclipped from the clip 48A on the side of the instrument 46 and, being coupled to the instrument by the cable 48B, the reader can be used as a wand to read the code. Another terminal socket 64 on the instrument is provided for downloading data stored in the instrument to a separate computer if, and when, desired.

In the embodiment depicted in FIGS. 6–9, variations on the tube installation and coupling device configuration are illustrated for a measuring tube. Instead of being directly welded to the deck, tube 23 is supported by an assembly 60 which is easily installed and adjusted, allowing the tube to be replaced if necessary. In this arrangement, collar 71, screwed onto sleeve 73, causes wedge ring 72 to engage the chamfered surface 74 of sleeve 73 and clamp the collar and sleeve to the tube. Sleeve 73 is threaddedly attached to housing 80. Once assembled, the tube and housing assembly can be brought to the installation site which is prepared by providing hole 101 in the deck 31 and welding the support flange 70 around hole 101. Tube 23 is then inserted into hole 101, and housing 80 is secured in place by fasteners, one of which is shown at bolt 84 and nut 85.

Figure 7:
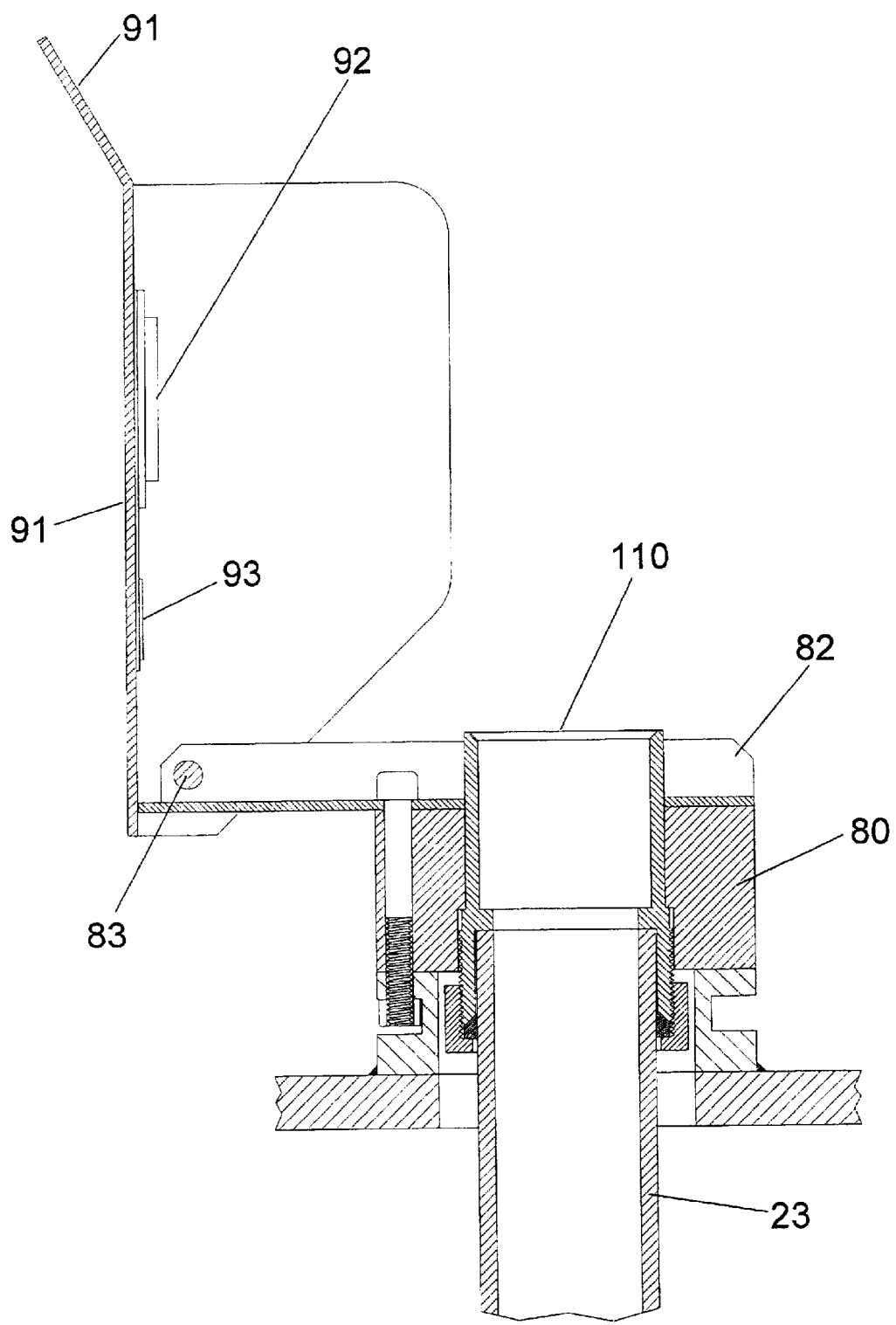
FIG. 7 is a view of the embodiment depicted in FIG. 6 with the lid lifted in preparation for coupling with the measuring instrument.
Figure 8:
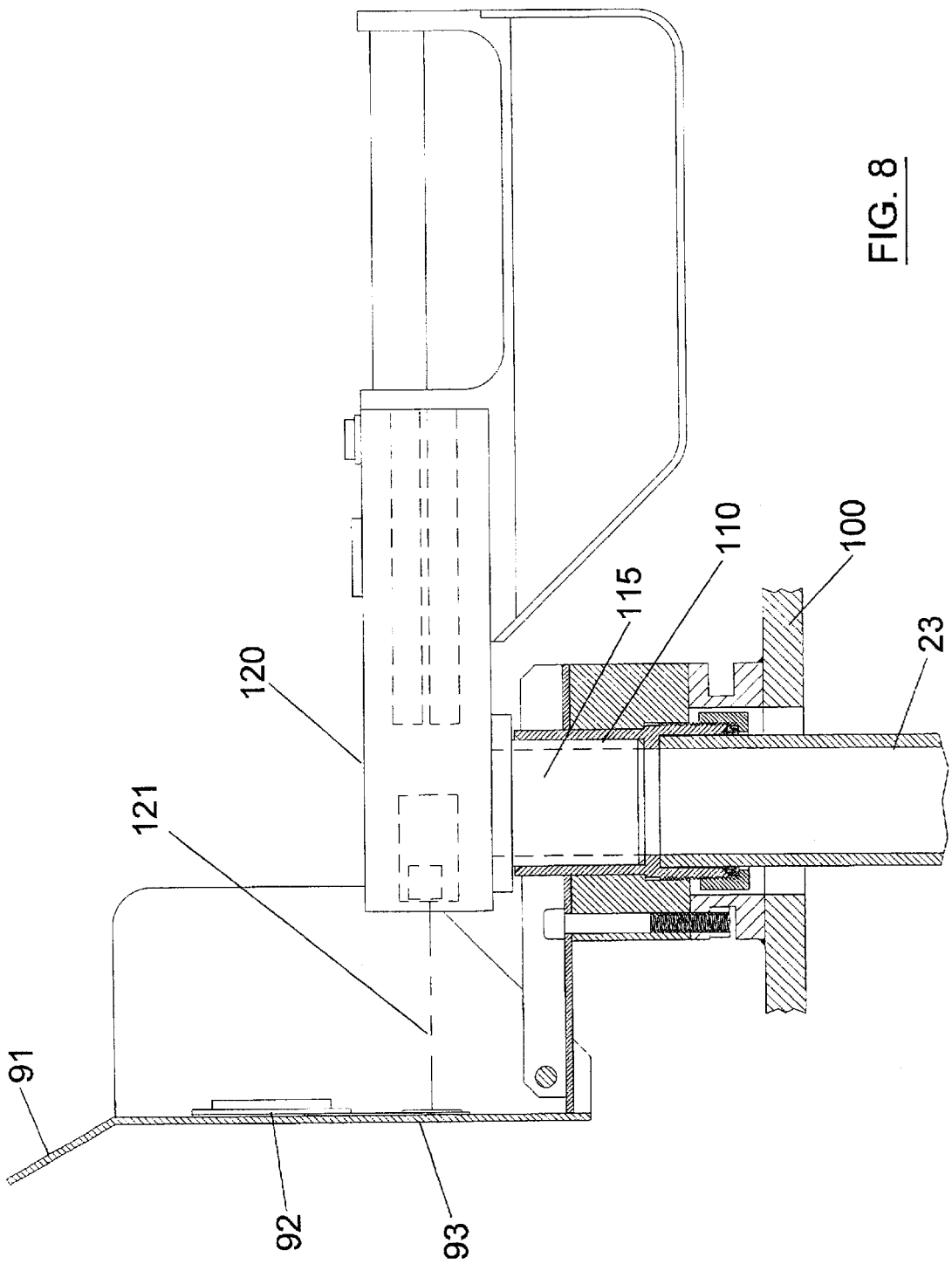
FIG. 8 is a view of the embodiment depicted in FIG. 7 with the measuring instrument coupled to the tube opening.

The tube cover and coupling device are also varied in this embodiment as bolt 84 also secures the base 81 of lid mounting bracket 82 to the top of housing 80. A pair of horizontally spaced rails 82R, upstanding from base 81, receives hinge pin 83 which passes through the horizontally-spaced, downwardly extending side guards 125 of lid 91 and connects lid 91 to housing 80. Lid 91 includes stopper 92 and side guards 125 to prevent external liquid from entering tube 23. Lid 91 further includes bar code plate 38 to provide information about the tube 23 as described previously. Thus to measure fluid depth, lid 91 is lifted using handle 90 as depicted in FIG. 7. Lifting lid 91 simultaneously removes stopper 92 from the socket 110 of sleeve 73 and exposes bar code plate 38. The quick connect coupling in this embodiment comprises plug 115 on measuring instrument 120 which fits snugly inside socket 110 atop tube 23 as depicted in FIG. 8. The entire apparatus is arranged such that with lid 91 substantially vertical and measuring instrument 120 inserted into socket 110, bar code reader 48 is substantially aligned with bar code 39 as illustrated by line 121 (FIG. 8). Measuring is performed substantially the same as described in previous embodiments and, when complete, lid 91 is lowered covering socket 110.

Some additional description of the procedure and sequence is appropriate here. In either of the embodiments depicted in FIGS. 4 to 9 and, after the measuring instrument is coupled mechanically or electrically to the tube, the appropriate button is pushed. It is preferable that the master tube at either end of the barge be addressed first, to set up the instrument for immediate annunciation of an alarm condition if excessive liquid depth is detected in any of the measuring tubes on the barge. The transducer pulse rate is established so that the echo can be received by the transducer from the reflecting plug 33 during the period between the times of transmission of pulses from the transducer. The computer relates the time between a transmitted pulse and the reflected echo pulse with the known distance between the transducer and the plug top, to establish the present actual velocity of sound in the air in the tube. The computer stores the corresponding UE value and, simultaneously, using this value, presents the master tube dimension, such as 132 inches, for example, on the display 53. All of this occurs while the "MASTER" button 49 is pressed. The same sort of function occurs when the instrument is coupled to a measuring tube and the "READ" button 51 is pressed. But in this case, instead of displaying the distance from the transducer to the liquid surface, (which could easily be done, if desired) the computer uses the stored information regarding the barge compartment depth, to directly display the depth of liquid, if any, in the compartment.

As examples, an ultrasonic pulse transmitter having a pulse frequency capability of 25,000 Hz (cycles per second) to 100,000 Hz may be used. A desirable frequency may be 50,000 Hz. The pulse repetition rate can be in a range from 0.02 to 6,000 cycles per minute. A desirable rate may be 600 cycles per minute. If desired, the measuring instrument can be equipped with means to enable the user to adjust the pulse frequency and the pulse repetition rate.

The sequence of events in the actual measurement process is summarized as follows:
1. Disable receiver.
2. Transmit pulse at time t1.
3. Enable receiver and receive echo pulse at time t2.
4. Using the known transducer to plug distance, d1, calculate the multiplication (UE) factor to be multiplied to the elapsed time t2–t1 to equal the known distance d1.
5. Store UE.
6. Repeat steps 1–3 on a measuring tube.
7. Multiply the stored UE by the elapsed time.
8. Convert the result of step 7 to depth of liquid below the echo reflecting surface.
9. Display the depth and, if alarm condition, activate warning light and sounder.

It should be recognized that, by the use of the code system for identifying not only the compartments on a barge, but also the barges in a string, each compartment has a unique identification. Therefore, a person checking compartments on a string of barges could walk from one barge to another, from one end of the string to the other end, along the port side, and then back down the starboard side to the starting point, visiting the master on each barge and all the measuring tubes on all the barges. At each tube, the depth information can be stored immediately in the computer. Then all of the information can be downloaded into a separate computer at the dock or other location, and a printed record made, with bullets or other flags shown adjacent the record for any compartment that is in alarm condition. If for some reason, some measuring tubes on a barge would be addressed by the inspector before addressing the master tube on the barge, alarm conditions would not necessarily be accurately indicated until the master tube is addressed, to then correct the elapsed time (t2–t1) by the UE factor for each tube. After the master tube is used to calibrate the measuring instrument computer processing for a given barge, and the necessary multiplication factor is stored in the instrument computer for that particular barge, depth information can be calculated and stored and printed for all void space compartments on the barge, regardless of whether the master is addressed before, somewhere between, or after the measuring tubes for the various compartments are addressed. If the desired accuracy of depth determination is not so great that correction for temperature is necessary, it would not be necessary to check the master tube each time that barge compartments are checked. But, as indicated above, good consistent practice is to address the master tube before addressing the rest of the measuring tubes on a barge. If precision is desired, the computer can be further programmed to require that all measurements for a given barge be taken within a specific period of time.

Until now embodiments adapted to detect the presence of liquid in void space compartments of vessels have been particularly discussed. Another embodiment of the invention relates to overfill protection for cargo compartments/tanks. In overfill protection applications, as shown in FIG. 10 for a typical cargo tank 22 in the barge, both master tube 27F and measuring tube 23F are shorter to detect a critical liquid level that is near the top of the tank. In this case, plug 33F sealed in the bottom of tube 27F has its top surface at the level of the desired maximum or critical level 45T for liquid 45 in the tank. This level can be as near the top of the tank as desired, and the master tube plugged accordingly. In the illustration, there is expansion space allowed over the top of the liquid. The measurement tube is open at the bottom as are the measurement tubes in the other embodiments. The measurement tube extends down to a level below the level of the top of the plug in the master tube. Optimally it extends to a level enough below the plug level to be certain to provide overfill protection. Actual use of the overfill protection aspect of the invention is similar to the usage in detecting the presence of unwanted liquid in void space compartments. Additional features can be employed such as activating an alarm in either application of the invention, or automatically shutting off a fill pump in the overfill protection application once a critical liquid level is detected. By using the bar code identification for the material contained in the tank, and an appropriate data base in the computer with expansion coefficients in it for the contained material, and with the master tube plug 33F at the optimum location to accommodate the variety of materials which may be contained in the cargo tank, activation of the alarm, or pump shutoff, may be adapted by the computer to the material contained, so that adequate expansion space will be assured. In some instances, due to environmental protection requirements, governmental regulations do not permit discharge to atmosphere of the air or vapors above the liquid surface in a tank. Where the Contents of the tank are of a nature such that discharge of vapor is prohibited, an open-bottom measuring tube may not be permitted. In those cases, a measuring tube with closed bottom, external float and internal float follower and signal reflector, may be used. Such construction is disclosed in my co-pending application executed on Jul. 23, 1997 and filed Jul. 24, 1997 and entitled "Liquid Level Indicator for Storage Tank (later issued May 26, 1999, U.S. Pat. No. 5,900,546). The disclosure of that application is hereby incorporated herein by reference. It will be recognized that the present invention in its various forms may be useful in void space compartments or cargo compartments in vessels for transportation on land or water. It may also be used for stationary vessels.

Three examples of identification (ID) numbers (#) of a container, such as a barge, ship, railroad tank car or tank in a tank farm, are:

Examples of Container ID #
    ACBL1034
    IB1099
    IB970
Examples of three tanks within a barge are:
Examples of Tank #
    1P
    2S
    6P Examples of Master Indicator
  0 Not a mastering location
  1 Mastering location
Examples of Master Depth in Inches:
  008
  084
  144
  156
Examples of Tank Depth in Inches:
  020
  120
  142
An example of the barcode convention is as follows:

| | | 20 Characters Total | | | |
|---|---|---|---|---|---|
| Container ID # | Tank | Master Ind. | Master Depth MD | Tank Depth | Not Used |
| XXXXXXXX (8 characters) | XX (2 chtrs.) | X (1 chtrs.) | XXX (3 characters) | XXX (3 chrts.) | XXX (3 chrts.) |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination with a plurality of compartments in a series, monitor apparatus comprising:

a measuring tube in each compartment and extending to a point near the bottom of the compartment, and a transducer mountable on the tubes sequentially and oriented when mounted on a tube, to transmit energy downward in the tube and receive energy reflected through the tube from the bottom of the compartment in which the tube is located.

2. The apparatus of claim 1 and further comprising:
a measuring instrument adapted to be coupled to the tubes in sequence, and to activate the transducer and respond to a reflected energy signal.

3. The apparatus of claim 2 and wherein:
the measuring instrument includes a computer storing information representing specific compartments in the series.

4. The combination of claim 1 and further comprising:
a plurality of vessels in a string;
a plurality of said compartments in each vessel;
code identification unique for each vessel to distinguish that vessel from each other vessel in the string;
code identification unique to each compartment in the vessel to distinguish that compartment from each other compartment in the vessel;
the code for vessel and compartment being accessible and detectable at each compartment;
a measuring instrument adapted to be coupled to the tubes in sequence, and to activate the transducer and respond to a reflected energy signal.

5. The combination of claim 4 and wherein:
the measuring instrument includes a code reader.

6. The combination of claim 4 and wherein:
the measuring instrument includes the transducer.

7. The combination of claim 1 and further comprising:
a plurality of transducers, one of each transducers of the plurality being mounted on the tube of each compartment;
a measuring instrument;
an electrical coupling cable coupled to the instrument and connectable to the transducers in sequence for coupling the instrument to the transducers in sequence, to enable the instrument to activate the coupled transducer to transmit energy down the tube, and to enable the instrument to respond to reflected energy sensed by the transducer.

8. The combination of claim 7 and where in:
a unique compartment-identifier code is presented at each compartment;
the measuring instrument includes a housing containing a computer and controller, and includes a code reader;
the code reader is electrically coupled to the controller and, while remaining electrically coupled to the controller, is removably mounted to the housing for use while spaced from the instrument housing.

9. The combination of claim 8 and wherein:
the code is a bar code.

10. The apparatus of claim 1 and further comprising:
a master tube having a receiver for mounting the transducer thereon;
the master tube being closed at a known distance from the receiver.

11. The apparatus of claim 10 and wherein:
the master tube is located in one of the compartments, and extends downward toward the bottom of the compartment, the closure of the master tube being at a location to prevent entry of liquid from the compartment into the master tube.

12. The apparatus of claim 11 and wherein:
the master tube has a lower end adjacent the bottom of the compartment.

13. The apparatus of claim 12 and wherein:
The master tube is identical to the measuring tube in each compartment, except that the master tube is closed at the lower end of the tube.

14. The apparatus of claim 1 and wherein:
a unique compartment-identifier code is presented at each compartment;
the measuring instrument includes a housing containing a computer and controller and the transducer, and includes a code reader responsive to the identifier codes to store compartment-identifier information in the computer.

15. The apparatus of claim 14 and wherein:
the measuring instrument is portable, hand-held and further includes an operating button, information display, and alarm indicator.

16. For a vessel having a double-walled hull wherein there is an inner wall defining the outer boundary of a container hull partitioned into a storage tanks, and an outer wall spaced from the inner wall and defining the outer boundary of a protective hull, the space between the hulls being partitioned into a plurality of compartments, the improvement in apparatus for measuring the depth of liquid when present in such compartments and characterized in that:
measuring tubes are provided in such compartments, the tubes extending downward from the top of the compartment to a lower end, the upper ends of the tubes being normally closed outside the compartments;

a master tube on the vessel and having a measuring instrument adapter end and a reflector mount end, the adapter end being located at a distance from the reflector end which is at least as large as the distance from the upper ends of said measuring tubes to the surface of liquid in a measuring tube when the depth of liquid which has entered that measuring tube from the compartment containing that measuring tube is a maximum predetermined to be acceptable.

17. The improvement of claim 16 and further comprising:

a transducer removably connectable to all of the tubes in sequence, and an annunciator coupled to the transducer to announce depth measurement.

18. The improvement of claim 16 and wherein:

the measuring tubes have measuring instrument adapters at said upper ends.

19. The improvement of claim 18 and further comprising:

a computer coupled to the transducer and periodically energizing the transducer to produce and transmit into a tube, pulses of energy and periodically enabling the transducer to receive reflected energy from within a tube and compute elapsed time between transmission and reception and convert to liquid depth.

20. The improvement of claim 16 and further comprising:

a bar code at each measuring tube and constructed for identifying the location of the tube and distinguishing its location from the locations of other tubes.

21. The improvement of claim 20 and wherein:

the bar code is further constructed so that it identifies the vessel and distinguishes the vessel from other vessels.

22. A method of detecting the level of liquid in a compartment and comprising:

providing a measuring tube in the compartment with an opening in the tube communicating with liquid when present in the bottom of the compartment;

transmitting down the inside of the tube toward the bottom of the compartment, wave energy;

reflecting energy upward inside the tube;

responding to the reflected energy to determine the time elapsed from transmission to reception; and using the elapsed time to determine the distance from the source of transmitted energy to the surface from which the reflected energy is reflected.

23. A method of detecting the level of liquid in a compartment and comprising the steps of:

providing a measuring tube in the compartment;

transmitting down the tube, wave energy;

reflecting energy upward in the tube;

responding to the reflected energy to determine the time elapsed from transmission to reception;

using the elapsed time to determine the distance from the source of transmitted energy to the source of reflected energy;

providing a master tube in the compartment and having a known relation to the depth of the compartment;

transmitting down the master tube, wave energy;

reflecting energy upward in the master tube from a fixed location at a known distance in the master tube from the source of the transmitted energy;

responding to the reflected energy to determine the time elapsed from transmission to reception in the master tube; and using the elapsed time and known distance to establish a factor useful to determine the relationship of the source of reflected energy in the measuring tube to the depth of the compartment.

24. The method of claim 23 and further comprising:

providing unique code identification of the measuring tube at the measuring tube, and unique code identification of the master tube at the master tube; and associating the code identification with the responding step at each tube to distinguish the responding step at the master tube from the responding step at the measuring tube.

25. The method of claim 24 applied to a plurality of compartments, with a measuring tube in each of the compartments, and further comprising:

providing for each of the tubes, a unique tube-identifier code.

26. The method of claim 25 for a plurality of compartment containing vessels and further comprising:

providing for each of the tubes in each vessel, a unique tube and vessel identifier code.

27. An apparatus to determine whether the level of liquid in a container has reached a critical level, said apparatus comprising:

a tube in said container, said tube having an open lower end extending to a point approximately below said critical level;

a transducer mountable on the tube above the lower end and oriented to transmit energy wirelessly downward in the tube and receive energy reflected wirelessly upward through the inside of the tube from liquid within the container;

a measuring instrument adapted to be coupled to the tube and to activate the transducer and respond to a reflected energy signal; and means to calculate the level of liquid in the container from the measurement of time elapsed from transmission to reception of the energy.

28. The apparatus of claim 27 further comprising:

a master tube having a receiver for mounting the transducer thereon;

the master tube being closed at a known distance from the receiver.

29. The apparatus of claim 27 further comprising:

an alarm device coupled to the instrument to signal when the critical fluid level has been reached.

30. The apparatus of claim 29 wherein said device includes a switch to stop filling the container with fluid.

* * * * *